July 17, 1934.  R. S. THURSTON  1,967,107
SPEED CONTROL OF INDUCTION MOTORS
Filed June 29, 1933
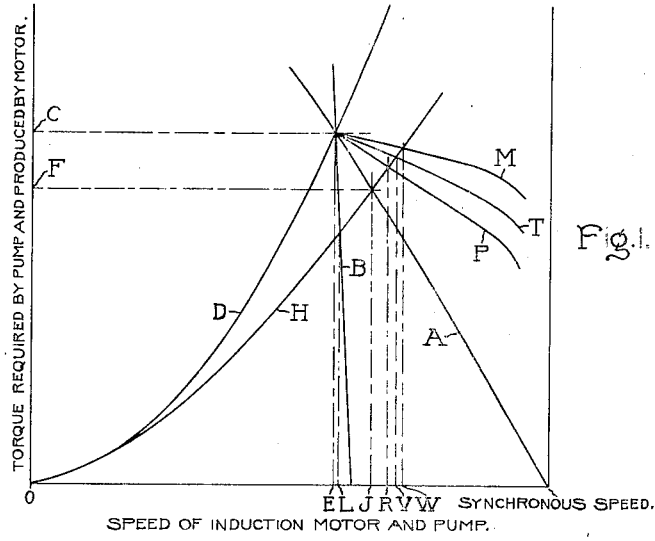
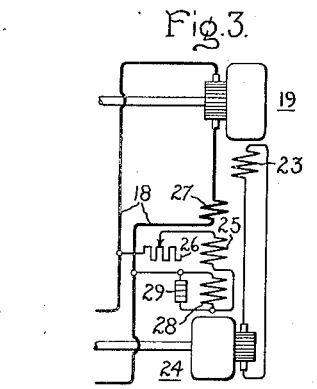
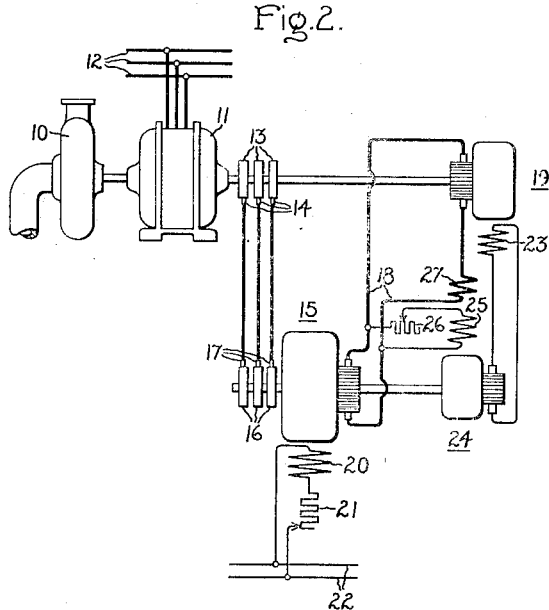
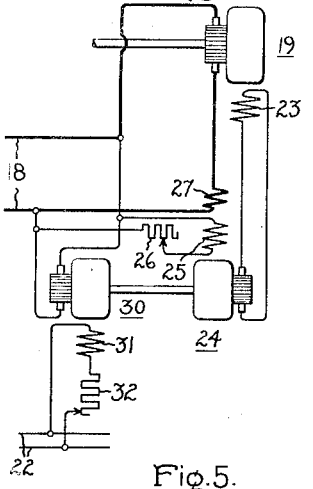
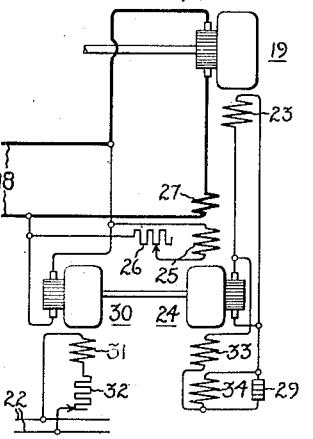
Inventor:
Robert S. Thurston,
by Harry E. Dunham
His Attorney.

Patented July 17, 1934

1,967,107

UNITED STATES PATENT OFFICE 1,967,107

SPEED CONTROL OF INDUCTION MOTORS

Robert S. Thurston, New York, N. Y., assignor to General Electric Company, a corporation of New York Application June 29, 1933, Serial No. 678,218

14 Claims. (Cl. 172—274)

My invention in its broad aspects relates to an arrangement wherein an asynchronous dynamo electric machine is regulated by injecting slip frequency voltage of adjustable magnitude and phase into its secondary winding by means of a direct current dynamo electric machine connected to the direct current side of a rotary converter whose alternating current side is connected to the secondary winding. The above arrangement is known to those skilled in this art as the synchronous converter control system and also as the Kramer control system. For the sake of brevity I will hereinafter refer to this arrangement as the Kramer control system. It is the object of my invention to provide an improved Kramer regulating set. At present I believe that the most important practical application of my invention is for controlling the speed of a wound secondary induction motor driving a centrifugal pump. However, I wish it clearly understood that my invention is not limited to this use.

In the operation of a centrifugal pump it frequently occurs that the discharge line from the pump becomes clogged. It is desirable that when this occurs the speed of the pump should automatically increase so as to increase the pressure in the discharge line and thereby produce a tendency to clear the clogged point in the line, and when the line has been cleared the speed of the pump should automatically decrease to its previously adjusted value. This inherent speed regulation together with the feature of speed adjustability may be obtained by employing a wound secondary induction motor to drive the pump and connecting an adjustable resistance in series with the motor secondary winding. The loss of power in this resistance, however, considerably lowers the overall efficiency of the set. This efficiency may be maintained at a high value and the speed adjusting feature retained by employing a wound secondary induction motor to drive the pump and concatenating with the motor secondary winding some form of well known dynamic control apparatus, as for example a Kramer regulating set or a Sherbius regulating set, both of which are well known. However, in either of these cases the inherent speed regulation of the motor is unsuitable for driving the pump, because there is only a very slight increase in the speed of the motor from full load to no load, and, therefore, there is practically no increase in pump pressure when the discharge line becomes clogged. It therefore became desirable to provide some form of speed control apparatus for a wound secondary induction motor that will automatically cause the latter to have the desired inherent speed regulation without simultaneously involving a comparatively high power loss so that the overall efficiency of the set may be comparatively high.

My invention provides this desired form of speed control apparatus. Briefly described, it consists of a Kramer regulating set so arranged that the excitation of its direct current dynamo electric machine depends on the load imposed on the induction motor by the pump. When the pump discharge line becomes clogged, the motor load decreases, thus decreasing the excitation of the direct current dynamo electric machine and causing the motor speed to increase, and when the discharge line is cleared the reverse occurs.

My invention, however, will be best understood from the following description when considered in connection with the accompanying drawing, while those features of my invention which are believed to be novel and patentable are pointed out in the appended claims.

Fig. 1 of the drawing represents typical speed-torque curves of a centrifugal pump, and comparable inherent speed-torque curves of an induction motor employing the prior art speed regulating apparatus as contrasted with an induction motor employing my improved speed regulating apparatus. Fig. 2 represents a simple form of my improved Kramer regulating set employing an exciter driven by the rotary converter for energizing the exciting winding of the main direct current dynamo electric machine. Fig. 3 shows a modification in which the exciter has a main exciting winding and a differential exciting winding and a device having non-linear, volt-ampere characteristics connected across the differential winding. Fig. 4 represents a modification where the exciter is driven by a direct current motor which is energized by the rotary converter. Fig. 5 represents a preferred modification employing some of the features of the exciter shown in Figs. 3 and 4 for obtaining a high degree of flexibility in the control of the induction motor and a nearly constant torque type of inherent speed regulation thereof. Similar elements in the various figures are represented by the same reference characters.

In Fig. 1, let us assume that A represents a portion of the speed-torque curve of a typical wound secondary induction motor with some given value of an adjustable resistance connected in series with its secondary winding for regulating the motor speed, and let us also assume that B represents a portion of the speed-torque curve of a typical wound secondary induction motor combination at some definite value of the resistance connected in series with the exciting winding of the main direct current dynamo electric machine of the usual Kramer regulating set employed for regulating the induction motor speed. For purposes of discussion, let us assume that the pump discharge line is clear, that the pump requires a driving torque represented by C and that it is operating on its speed-torque curve D. First assume that the pump is driven by a wound secondary induction motor with external resistance in series with its secondary winding and having a speed-torque characteristic represented by curve A. The pump will then rotate at the speed represented by E. If the discharge pipe of the pump suddenly becomes clogged there will be less flow from the pump, hence the torque required by the latter will decrease from C to F, for example, and the pump will now operate on its speed-torque represented by H, for example, and therefore the motor speed will increase from E to J. The automatic increase in speed from E to J represents a desirable inherent speed regulation, although it is still insufficient, but the reduced overall efficiency, due to the large power loss in the resistance connected in series with the motor secondary winding, is highly objectionable. Now assume that the pump is again operating on its speed-torque curve D, that it is driven by an induction motor provided with the usual Kramer type regulating set which causes the motor to have a speed-torque characteristic represented by curve B, and that it is rotating at the speed represented by E. Further assume that the pump discharge line suddenly becomes clogged so that the pump operates on its speed-torque curve H. This will cause the motor speed to increase from E to L, which, as can be seen, is only a very slight speed increase from the value E. As previously described, this inherent speed regulation is unsatisfactory even though the overall efficiency of the set is maintained at a high value. With my improved Kramer type regulating set, however, it is possible to retain a high overall efficiency and obtain any desired degree of inherent speed regulation between the limiting characteristics represented by B and a nearly constant torque type of inherent speed regulation as represented for example by curve M.

In Fig. 2, I have represented a centrifugal pump by numeral 10, the pump being driven by an induction motor 11. This motor has a stationary primary winding connected to an alternating current source 12, and a rotatable secondary winding connected to collector rings 13 on which rest brushes 14. A rotary converter represented generally by 15 has its alternating current side connected to the motor secondary winding through collector rings 16, brushes 17, and suitable leads. The direct current side of the converter is connected through leads 18 to the armature winding of a direct current dynamo electric machine represented generally by 19. Rotary converter 15 has an exciting winding 20 connected in series with an adjustable resistance 21 to a direct current source 22. Machine 19 has an exciting winding 23 connected to the armature winding of a direct current exciter represented generally by 24, this exciter having a main exciting winding 25 connected in series with an adjustable resistance 26 across the direct current side of the converter and a series exciting winding 27 connected in series with leads 18. Exciting windings 25 and 27 are so arranged that when energized their magnetomotive forces aid each other. The armature of exciter 24 is mechanically coupled to the rotary element of converter 15 so as to be driven thereby. In order to simplify the explanation of my invention, I have shown the armature of machine 19 mechanically coupled to the rotatable element of the induction motor, but from the description hereinafter given of my invention it will be obvious to those skilled in the art that my invention can also be used in those arrangements where machine 19 is not mechanically coupled to the induction motor.

A description of the operation of the apparatus illustrated in Fig. 2 follows. For any fixed value of excitation of exciter 24, and therefore of machine 19, the motor 11 tends to run at a nearly constant speed independent of the particular speed-torque characteristics it is desired that the motor should have. In order to obtain the desired motor speed-torque characteristics so that the speed of the motor-pump set will be determined by load conditions on the pump, I make a portion of the excitation of exciter 24, and therefore of machine 19, dependent on the load on the pump. This is accomplished by the series field winding 27 which furnishes a fraction of the total excitation required by exciter 24. The remainder of the excitation required by the exciter 24 is furnished by its main exciting winding 25, which supplies an excitation that decreases rapidly as the speed of motor 11 increases and that increases rapidly as the speed of motor 11 decreases. This causes motor 11 to have the desired speed-torque characteristics. Thus, assume for example that pump 10 is operating on its speed-torque curve D, that it requires a driving torque C, and that by adjusting resistance 26 the pump is driven by motor 11 at the speed E. Now assume that the discharge pipe of the pump suddenly becomes clogged so that the pump operates on its speed-torque curve H. The immediate effect of the decrease in torque required by the pump is to decrease the load on the motor 11 and thereby reduce the excitation of series exciting winding 27. This reduces the voltage generated by exciter 24, which causes the voltage generated by machine 19 to decrease, and this in turn causes the speed of motor 11 to increase. As the motor speed increases, the magnitude and frequency of the voltage across its collector rings 13 decrease, thus decreasing the speed of converter 15 and decreasing the magnitude of the direct current voltage of the converter. This in turn decreases the speed of exciter 24 and decreases the excitation of its main exciting winding 25, thus further reducing the voltage generated by exciter 24, hence further reducing the voltage generated by machine 19 and further increasing the speed of motor 11. Therefore, as the speed of motor 11 increases, the excitation of exciting winding 25 decreases rapidly, which tends to increase the speed of the motor still further. However, as the speed of the motor increases, the power required by the pump increases, and the power input to the motor increases, hence the current flowing through series exciting winding 27 starts to increase again. This increasing excitation of exciting winding 27 tends to increase the voltage generated by exciter 24, and, therefore, tends to decrease the speed of motor 11. The result of this tendency is that an equilibrium speed will be reached where the sum of the excitations of exciting windings 25 and 27 will cause machine 19 to generate a voltage which is just sufficient to maintain this equilibrium speed. Because of the above mentioned rapidly decreasing excitation of winding 25, the motor 11 has a speed-torque characteristics represented, for example, by curve P. The above mentioned equilibrium speed which the motor reaches and runs at is, therefore, represented by R. It can be seen that speed R is considerably above speed E, thus considerably increasing the pressure of the pump and therefore producing a very strong tendency to clear the clogged discharge pipe. When the discharge pipe is cleared, the reverse of the action previously described takes place, hence the speed of motor 11 automatically decreases to its former value E.

The slope of curve P can be varied by suitably selecting the ratio between the number of turns in the exciting windings 25 and 27 of exciter 24, and by suitably adjusting the amount of resistance 26 in series with exciting winding 25. Furthermore, by adjusting resistance 26 the speed of motor 11 can be varied, i. e., curve P can be raised above or lowered below its position shown in the drawing. It should therefore be clear that the regulating arrangement shown in Fig. 2 combines the following three advantages: (1) It permits speed regulation of the induction motor; (2) it causes the induction motor to have the desired speed-torque characteristics; and (3) it involves na greater losses than the ordinary Kramer regulating set, hence maintaining the efficiency of the complete set at a comparatively high value.

In Fig. 3, as well as in Figs. 4 and 5, I have omitted the pump, induction motor and rotary converter, and have only shown the regulating set for varying the voltage across leads 18 connected to the direct current side of the rotary converter. Referring to the arrangement shown in Fig. 3, this is similar to that shown in Fig. 2, except that an exciting winding 28 is connected in series with exciting winding 25 so that its magnetomotive force will oppose those of windings 25 and 27; hence, I will hereinafter refer to exciting windings 25 and 28 as the main and differential exciting windings, respectively. Across the differential exciting winding 28, I connect a circuit whose resistance decreases exponentially with increasing voltage impressed thereon. It is clear that this circuit will have a non-linear volt-ampere characteristic. Any means may be employed for obtaining a circuit having these characteristics. I prefer to obtain such a circuit by connecting across exciting winding 28 a negative current-resistance characteristic resistance element 29. This element therefore has a non-linear volt-ampere characteristic. Element 29 is preferably composed of the special resistance material which is disclosed and claimed in United States Patent No. 1,822,742, McEachron, issued September 8, 1931, and assigned to the assignee of this application. This material has the property of reducing its electrical resistance instantaneously and exponentially with increase in applied voltage across it, or current density through it, or both. Furthermore, this change in resistance is substantially independent of changes in its temperature, so that the regulating arrangement depending for its operation on the change in resistance of this material is not affected by changes in ambient temperature. Furthermore, the instantaneously acting feature of this resistance material makes it particularly valuable in such a regulating system.

A brief description of the arrangement shown in Fig. 3 follows, it being understood that its leads 18 are connected to converter 15 in Fig. 2. Assume that the pump discharge line is clear, that the pump is operating on its speed-torque curve D, and that resistance 26 has been adjusted so that motor 11 is driving the pump at the speed E at which the torque required by the pump is represented by C. It is clear that the current flowing through the main exciting winding 25 divides between the differential exciting winding 28 and resistance element 29, and that there is some definite ratio between the currents flowing in winding 28 and element 29 at this operating condition. Now assume that the discharge pipe of the pump suddenly becomes clogged so that the pump operates on its speed-torque curve H. As described in connection with Fig. 2, the immediate effect will be a decrease in the current flowing in series exciting winding 27 and an increase in the speed of motor 11, thus causing a decrease in the speed of exciter 24 and a decrease in the voltage impressed across the series connected exciting windings 25 and 28. This decrease in voltage not only decreases the excitation of winding 25, but, due to the fact that the resistance of element 29 increases greatly and practically instantaneously with a decrease in voltage thereacross, also causes a decrease in the ratio between the currents flowing through windings 25 and 28; in other words, it causes a greater portion of the current flowing through main exciting winding 25 to flow through the differential exciting winding 28. This causes a disproportionate reduction in the voltage generated by exciter 24, and in turn of the voltage generated by machine 19. It is therefore clear that this will increase the speed of motor 11 to a greater extent than that described in connection with Fig. 2, hence the arrangement shown in Fig. 3 will cause motor 11 to have a more nearly constant torque type of inherent speed regulation than the arrangement shown in Fig. 2. Therefore, motor 11 will have a speed-torque characteristic as represented for example by curve T and it will drive the pump at the speed represented by V. Speed V is considerably above speed E, thus greatly increasing the pressure of the pump and, therefore, producing a very strong tendency to clear the clogged pump discharge line. When this line has been cleared the reverse of the action previously described takes place, hence the speed of motor 11 automatically decrases to its former value E. It is clear that with the arrangement shown in Fig. 3 is is possible to obtain a higher degree of regulation than with the arrangement shown in Fig. 2, and, furthermore, both the type and degree of regulation can be widely varied by using different combinations of constants of the exciting windings, especially of main and differential exciting windings 25 and 28.

The arrangement shown in Fig. 4 is identical with the corresponding arrangement shown in Fig. 2, except that exciter 24 is driven by a direct current motor represented generally by 30 instead of being driven by the rotary converter. Motor 30 has an armature winding connected across leads 18, and has an exciting winding 31 connected in series with an adjustable resistance 32 across source 22. Since the armature of motor 30 is energized by the direct current voltage of converter 15, and since this voltage is substantially directly proportional to the speed of the converter because the magnitude and frequency of the voltage on the alternating current side of the converter are substantially directly proportional to each other, it follows that the speed of motor 30 will be substantially directly proportional to the speed of the converter. Consequently, the arrangement shown in Fig. 4 will cause motor 11 to operate as described in connection with Fig. 2. The arrangement shown in Fig. 4, however, has a very important practical advantage over that shown in Fig. 2, since its exciter 24 may be a small, high speed, efficient machine because motor 30 may be a high speed motor, whereas in Fig. 2 the exciter 24 was a slow speed and less efficient machine, because the converter necessarily runs at low speeds when motor 11 is operating at nearly its synchronous speed.

The arrangement shown in Fig. 5 is identical with that shown in Fig. 4, except that exciter 24 has two additional exciting windings 33 and 34 connected in series across its armature winding. Exciting winding 33 is so arranged that its magnetomotive force will assist those produced by windings 25 and 27, whereas winding 34 is so arranged that its magnetomotive force will oppose those produced by windings 25, 27 and 33. Hence, I will hereinafter refer to windings 33 and 34 as main and differential exciting windings, respectively. Across the differential exciting winding 34 is connected a negative current-resistance characteristic resistance element 29.

A brief description of the arrangement shown in Fig. 5 follows, it being understood that its leads 18 are connected to converter 15 in Fig. 2. Assume that the pump discharge line is clear, that the pump is operating on its speed-torque curve D, and that resistances 26 and 32 have been adjusted so that motor 11 is driving the pump at the speed E at which the torque required by the pump is represented by C. It is clear that exciter 24 is operating both as a separately excited and self excited generator, the former because of the excitation of main and series exciting windings 25 and 27, and the latter because of the excitation of main and differential exciting windings 33 and 34. It is also clear that the current flowing through main exciting winding 33 divides between the differential exciting winding 34 and resistance element 29, and that there is some definite ratio between the currents flowing in winding 34 and resistance element 29 at this operating condition. Now, assume that the discharge pipe of the pump suddenly becomes clogged so that the pump operates on its speed torque curve H. As described in connection with Fig. 2, the immediate effect will be a decrease in the current flowing in series exciting winding 27 and an increase in the speed of motor 11, thus causing a decrease in the speed of exciter 24 and a decrease in the voltage impressed on the main exciting winding 25. This decrease in the speed of exciter 24 and the decrease in excitation of its exciting windings 25 and 27 causes a considerable decrease in the voltage generated by the exciter, hence decreasing the voltage impressed on its main and differential exciting windings 33 and 34. This decrease in voltage generated by exciter 24 not only decreases the excitation of its main and differential exciting windings 33 and 34, but, due to the fact that the resistance of element 29 increases greatly and practically instantaneously with a decrease in voltage thereacross, also causes a decrease in the ratio between the currents flowing through windings 33 and 34; in other words, it causes a greater portion of the current flowing through main exciting winding 33 to flow through the differential exciting winding 34. This causes a further and disproportionate reduction in the voltage generated by exciter 24, and in turn of the voltage generated by machine 19. It is therefore clear that this will increase the speed of motor 11 to even a greater extent than that described in connection with Fig. 3, hence the arrangement shown in Fig. 5 will have a more nearly constant torque type of inherent speed regulation than that represented by curve T. Thus, motor 11 will have a speed-torque characteristic as represented for example by curve M, and it will drive the pump at the speed represented by W. Speed W is considerably above speed E, thus greatly increasing the pressure of the pump and producing a very strong tendency to clear the clogged pump discharge line. When this line has been cleared the reverse of the action previously described takes place and the motor speed automatically decreases to its former value E. Both the type and degree of speed regulation can be widely varied by using different combinations of constants of the exciting windings, especially of exciting windings 33 and 34.

In accordance with the provisions of the patent statutes, I have described the principles of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said main exciting winding, an exciting winding for said exciter, and means for impressing on the exciting winding of said exciter a direct-current voltage whose magnitude varies in accordance with the direct-current voltage delivered by said rectifying means.

2. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said main exciting winding, a main exciting winding for said exciter, means for impressing on the exciting winding of said exciter a direct-current voltage whose magnitude varies in accordance with the magnitude of the direct-current voltage delivered by said rectifying means, and means for driving said exciter at a speed which varies in accordance with the magnitude of the direct-current voltage delivered by said rectifying means.

3. In combination, an asynchronous dynamo electric machine having relatively rotatable primary and secondary windings, a rotary converter having its alternating current side connected to said secondary winding, a direct current dynamo electric machine having an armature winding connected to the direct current side of said rotary converter, a main exciting winding for said direct current dynamo electric machine, a direct current exciter having an armature winding mechanically coupled to the rotary element of said rotary converter, means for connecting the armature winding of said exciter across said main exciting winding, and a main exciting winding for said exciter connected across the direct current side of said rotary converter.

4. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said main exciting winding, an exciting winding for said exciter connected across the direct current side of said rectifying means, and a direct current motor for driving said exciter, said motor having an armature winding connected across the direct current side of said rectifying means.

5. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said main exciting winding, an exciting winding for said exciter connected across the direct current side of said rectifying means, another exciting winding for said exciter connected across its armature winding, and means for driving said exciter at a speed which varies in accordance with the magnitude of the direct-current voltage delivered by said rectifying means.

6. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, and means for producing in said direct current dynamo electric machine a magnetizing flux whose magnitude varies in accordance with the sum of two variable factors, one of said factors being the magnitude of the direct-current voltage delivered by said rectifying means and the other of said factors being the magnitude of the direct current flowing between the armature winding of said direct current dynamo electric machine and the direct current side of said rectifying means.

7. In combination, an asynchronous dynamo electric machine having relatively rotatable primary and secondary windings, rectifying means having its alternating current side connected to said secondary winding, said rectifying means delivering on its direct current side a direct-current voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said main exciting winding, a main exciting winding for said exciter, means for impressing on the exciting winding of said exciter a direct-current voltage whose magnitude varies in accordance with the magnitude of the direct-current voltage delivered by said rectifying means, a series exciting winding for said exciter connected in series with the armature winding of said dynamo electric machine, the main and series windings of said exciter being arranged to produce assisting magnetomotive forces, and means for driving said exciter at a speed which varies in accordance with the magnitude of the direct-current voltage delivered by said rectifying means.

8. In combination, an asynchronous dynamo electric machine having relatively rotatable primary and secondary windings, a rotary converter having its alternating current side connected to said secondary winding, a direct current dynamo electric machine having an armature winding connected to the direct current side of said rotary converter, a main exciting winding for said direct current dynamo electric machine, a direct current exciter having an armature winding mechanically coupled to the rotary element of said rotary converter, means for connecting the armature winding of said exciter across said main exciting winding, a main exciting winding for said exciter connected across the direct current side of said rotary converter, and a series exciting winding for said exciter connected in series with the armature winding of said dynamo electric machine, the main and series exciting windings of said exciter being arranged to produce assisting magnetomotive forces.

9. In combination, an asynchronous dynamo electric machine having relatively rotatable primary and secondary windings, rectifying means having its alternating current side connected to said secondary winding, said rectifying means delivering on its direct current side a voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, and means responsive to the direct-current voltage delivered by said rectifying means for impressing on said exciting winding a direct-current voltage whose magnitude varies in a non-linear manner with variations in the magnitude of the direct-current voltage delivered by said rectifying means.

10. In combination, an asynchronous dynamo electric machine having relatively rotatable primary and secondary windings, rectifying means having its alternating current side connected to said secondary winding, said rectifying means delivering on its direct current side a voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, and means responsive to the direct-current voltage delivered by said rectifying means for impressing on said exciting winding a direct-current voltage whose magnitude increases and decreases in a non-linear manner with increasing and decreasing magnitudes respectively of the direct-current voltage delivered by said rectifying means.

11. In combination, an asynchronous dynamo electric machine having relatively rotatable primary and secondary windings, rectifying means having its alternating current side connected to said secondary winding, said rectifying means delivering on its direct current side a voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said exciting winding, two serially connected magnetically opposing exciting windings for said exciter, means for impressing across the free ends of said opposing exciting windings a direct-current voltage whose magnitude varies in accordance with the magnitude of the direct-current voltage delivered by said rectifying means, and a circuit having non-linear volt-ampere characteristics connected across one of said opposing exciting windings.

12. In combination, an asynchronous dynamo electric machine having relatively rotatable primary and secondary windings, rectifying means having its alternating current side connected to said secondary windings, said rectifying means delivering on its direct current side a voltage whose magnitude varies in accordance with the magnitude of the alternating voltage impressed on its alternating current side, a direct current dynamo electric machine having an armature winding connected to the direct current side of said rectifying means, a main exciting winding for said direct current dynamo electric machine, a direct current exciter having an armature winding connected to said exciting winding, two serially connected magnetically opposing exciting windings for said exciter, means for impressing across the free ends of said opposing exciting windings a direct-current voltage whose magnitude varies in accordance with the magnitude of the direct-current voltage delivered by said rectifying means, and a negative resistance-voltage characteristic resistance element connected across one of said opposing exciting windings.

13. In combination, an asynchronous dynamo electric machine having relatively rotatable primary and secondary windings, a rotary converter having its alternating current side connected to said secondary winding, a direct current dynamo electric machine having an armature winding connected to the direct current side of said rotary converter, a main exciting winding for said direct current dynamo electric machine, a direct current exciter having an armature winding mechanically coupled to the rotary element of said rotary converter, means for connecting the armature winding of said exciter across said main exciting winding, said exciter having a main exciting winding and a differential exciting winding connected in series with each other, means for connecting the free ends of said main and differential exciting windings across the direct current side of said rotary converter, a negative resistance-voltage characteristic resistance element connected across said differential exciting winding, and a series exciting winding for said exciter connected in series with the armature winding of said dynamo electric machine, the main and series exciting windings of said exciter being arranged to produce assisting magnetomotive forces.

14. In combination, an asynchronous dynamo electric machine having relatively rotatable primary and secondary windings, a rotary converter having its alternating current side connected to said secondary winding, a direct current dynamo electric machine having an armature winding connected to the direct current side of said rotary converter, an exciting winding for said direct current dynamo electric machine, a direct current exciter having an armature winding connected to said exciting winding, said exciter having a main exciting winding connected across the direct current side of said rotary converter and also having a main exciting winding and a differential exciting winding connected in series with each other across its armature winding, means for driving said exciter at a speed which varies in accordance with the speed of said rotary converter, a negative resistance-voltage characteristic resistance element connected across the differential exciting winding of said exciter, and a series exciting winding for said exciter connected in series with the armature winding of said dynamo electric machine, the main and series exciting windings of said exciter being arranged to produce assisting magnetomotive forces.

ROBERT S. THURSTON.